Aug. 29, 1950     E. W. PUMMILL     2,520,259

SELF-LOCKING NUT AND WASHER

Filed March 28, 1945

INVENTOR.
EDWIN W. PUMMILL.
BY
Lockwood, Goldsmith & Galt,
ATTORNEYS.

Patented Aug. 29, 1950

2,520,259

UNITED STATES PATENT OFFICE 2,520,259

SELF-LOCKING NUT AND WASHER

Edwin W. Pummill, Indianapolis, Ind.

Application March 28, 1945, Serial No. 585,311

14 Claims. (Cl. 151—19)

This invention relates to an initially integral washer and nut structure, subsequently separable in the threading home, of the structure upon a bolt and the like and then rigidly connected together, the washer serving as a stock confining element in the tightening of the nut to form so-called full threads within at least an appreciable portion of the washer thickness.

The chief object of this invention is to provide a structure wherein the initially integral parts, after rupture by axial pressure, are locked together by radially outward metal flow.

The chief feature of this invention resides in relieving by chamfering and the like the mouth of a counter bore in the work engaging face of the washer to provide an opposed seat for a lock whereby the washer is clamped to the nut.

Other objects and features of the invention will be set forth more fully hereinafter.

This application is a continuation-in-part of the copending application Serial No. 513,829 filed December 11, 1943, allowed October 31, 1944, now Patent No. 2,380,994, dated August 7, 1945.

The full nature of the invention will be understood from the accompanying drawing and the following description and claims:

Figure 2:
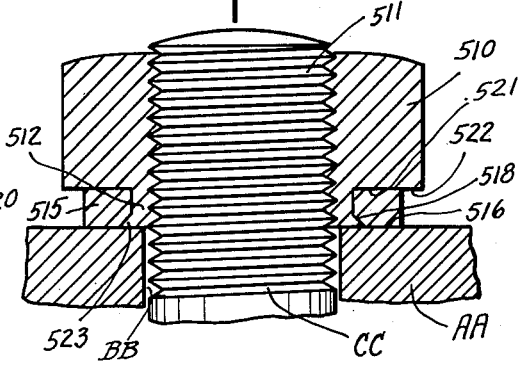
Fig. 2 is a similar view of such embodiment when applied to the work, a portion of the latter being illustrated in section and the bolt associated therewith being shown in elevation.

In Fig. 2 of the drawings $A^A$ indicates a piece of work with hole $B^B$ therein. Projecting from same is the bolt $C^C$. To the work exposed threaded end of bolt $C^C$ is applied the integral nut and washer structure.

Figure 1:
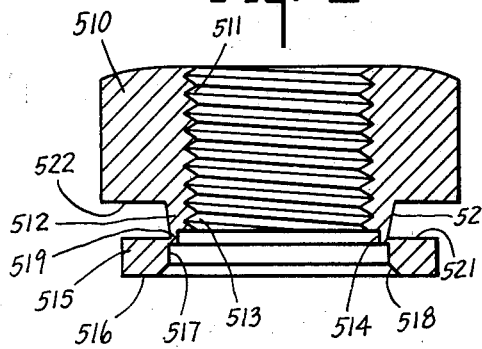
Fig. 1 is a central sectional view of an embodiment of the invention after fabrication and prior to work application.

Referring to Fig. 1, the structure, while same may take any one of several forms, is illustrated more particularly as of the type shown in the said copending application, with certain exceptions as hereinafter pointed out.

There is provided a nut body 510 with a threaded central bore 511 therethrough. Integral with this body and at the washer confronting face 522 thereof is a neck portion 512 which, coaxial with the central bore 511, is provided with a threaded extension 513 of the same. This may extend coextensive with the length of said neck, see said copending application, or terminate short of the washer end of said neck, the latter herein having a bore enlargement 514 as illustrated.

The washer body 515 may have a circular or polygonal exterior outline as desired. The diameter thereof may be as desired. If the structure is of bar stock and fabricated in an automatic screw machine, obviously it cannot be greater than that of the nut body.

The washer body 515 on its work confronting face 516 includes a coaxial counter bore 517. Said counter bore at its outer end is enlarged as at 518 by chamfering or the like and this relief or seat may take any desired form so that the radial sections thereof can be arcuate, plane, or angular, as desired.

The neck is connected to the washer by frangible portion 519 and herein the exterior 520 of the neck may be frusto-conical as shown, or cylindrical as desired. In either type when washer face 516 is engaged with work $A^A$, after nut 510 has been finger threaded down on bolt $C^C$, axial pressure applied to frangible portion 519 by reason of nut movement toward the work and resistance of the latter to further movement of the unit as a whole towards it, ruptures the unit. The washer is now free of the neck and nut, and if the former is of frusto-conical form it will immediately center in the washer counter bore and locate the washer.

If the neck is of frusto-conical character, further advance of same by nut threading toward the work forms an annular ridge about the washer on its nut confronting face 521, which may be sloped as desired, or flat as illustrated, see the copending application. Disregarding other actions which occur, when the washer confronting face 522 of nut 510 engages this annular ridge, the latter digs inwardly and upwardly into the neck at the neck-nut connection, which forces the metal into full thread bolt contact for at least a thread or so in the nut immediately adjacent face 522. This face also may be sloped as desired or flat as illustrated.

Between these stages nut advance causes the neck stock to do two things, that is, circumferentially fill the counterbore 517 at the back or nut end thereof and causes full thread contact between threads 513 and the bolt. As the nut is threaded home, this counterbore progressively fills up. The foregoing action is common to that disclosed in said application.

The action of this form of the invention now differs from the aforesaid application in that as the portion 519 advances into work engagement, the free end of the neck stock is forced radially outward. Enlargement 514 of the threaded bore 513 in the neck facilitates such action, although the enlargement may be omitted, if desired, with the same final result. As shown in Fig. 2, stock from the washer end of neck 512 flows outwardly and circumferentially fills seat 518 with the result that the nut and washer are now permanently locked together by portion 523, while the full thread formation is substantially, but not necessarily coextensive with the washer thickness, plus, if the frusto-conical neck be employed, at least one-half to two or more full threads in the nut.

Figure 3:
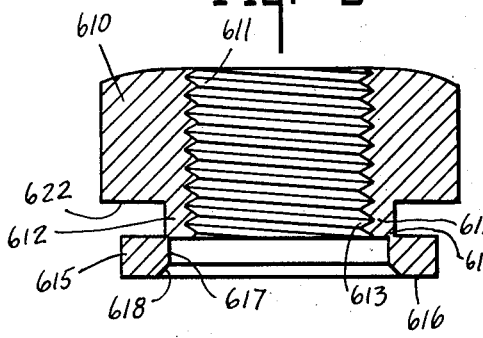
Fig. 3 is a view similar to Fig. 1 and of a cylindrical neck form of the invention.

A neck 612 of cylindrical form, see Fig. 3, with or without the thread bore enlargement, and of a diameter slightly greater than that of the washer counterbore will function basically as last described. In this form, the cylindrical neck is progressively squeezed into bolt engagement as the nut is tightened down upon the bolt, the washer slightly yielding therefor.

Figure 4:
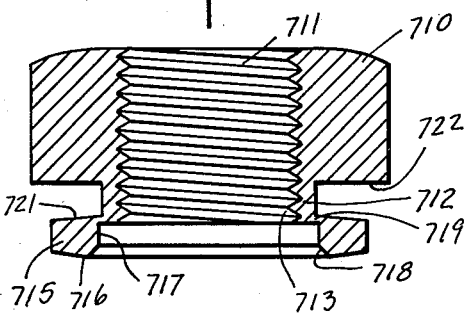
Fig. 4 is a similar view and of a slightly modified form of cylindrical neck embodiment of the invention.

A neck 712 of cylindrical form, see Fig. 4, with or without the thread bore enlargement, and of a diameter slightly less than that of the washer counterbore, will also function to a limited degree for full thread formation and fully function for seating and locking the bolt and washer together as last described. In this form of the invention it is axial pressure only between the nut and work that compresses the neck stock, which is washer confined as it flows into full thread formation, and also forms the seat lock aforesaid.

Figure 5:
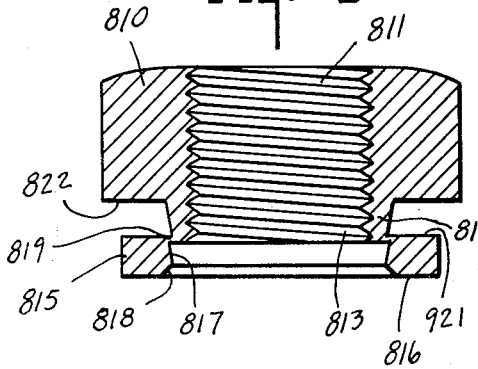
Fig. 5 is a similar view of a modified form of unit.

In Fig. 5 there is illustrated a modified form of the invention in which the neck portion 812 is frusto-conical, while counterbore 817 is tapered inwardly and enlarged toward the neck.

The neck 812 and counterbore 817 may have the same tapers or different tapers. If that of the neck 812 is more acute than that of the counterbore 817, the washer compressive pressure on the neck 812 progressively increases as the nut 810 is threaded upon the bolt and the neck 812 enters the counterbore 817. If the taper of the counterbore is more acute than that of the neck and the diameters of each are properly chosen, the washer initial compressive pressure on the neck is exerted adjacent the neck confronting face of the washer for initially rolling up a ridge thereon, which upon nut pressure being applied thereto "digs" into the neck 812 at its connection to the nut 810 to insure full thread formation in a part of the nut. Of course, in both forms final nut threading forces the neck stock at its free end outwardly to engage seat 918, comparable to that illustrated in Fig. 2 at 523, and thus again lock the washer to the nut by a clamping action.

When the "dogging" in lock is effected, the peening lock (see portion 523 in Fig. 2) may be omitted or utilized as desired. When "dogging in" is not effected, the "full thread formation" in the nut may not occur, but "full thread formation" does occur in the compressed neck portion by reason of washer confinement of compressed neck stock. The locking connection is positively maintained by the confining pressure exerted between the seat engaging portion and the nut for clamping the washer therebetween. As previously stated, either or both washer-nut locks may be utilized as desired or required for special connections.

Figure 6:
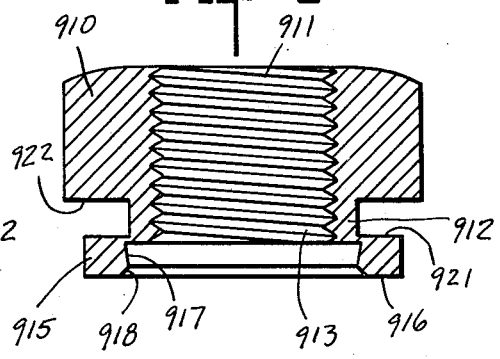
Fig. 6 is a similar view of a still further modified form of unit.

In Fig. 6 there is illustrated a modified form of unit. In this form the neck 912 is cylindrical as in Figs. 3 and 4 and the counterbore 917 is tapered as in Fig. 5.

This forces the washer stock to compress inwardly the neck stock and progressively. This also facilitates axial advance of the cylindrical neck 912 into the washer counterbore 917 and centers the washer 915 upon the neck 912 and bolt. When the free end of the neck engages the work, further nut advance forces that neck stock outwardly and circumferentially and into washer seat 918 contact. Thus, the washer at the neck confining portion will be clamped between the nut body 910 and the seat engaging portion of the neck stock comparable to portion 523 in Fig. 2.

The washer clamping action is such, in all these forms of the invention, that the volume of the neck stock must be at least sufficient to fill the counterbore axially and circumferentially and at least partially fill circumferentially the seat 518 in washer face 516 sufficient to clamp the washer 515 between the stock 523 and the nut 510. In all modifications (although in Fig. 4 to a lesser degree) there is a swelling or diametral increase in the washer.

While the invention has been illustrated and described in great detail in the drawings and foregoing description, the same is to be considered as illustrative and not restrictive in character.

The several modifications described herein as well as others which will readily suggest themselves to persons skilled in this art, all are considered to be within the broad scope of the invention, reference being had to the appended claims.

The invention claimed is:

1. In an initially integral nut and washer structure having a nut body with a threaded bore therethrough, a neck integral at one end with the nut body and having a bore therethrough aligned with the first bore and threaded for at least the major portion and forming a continuation of the nut body thread, the neck at any cross section having a maximum circumscribing diameter less than that of the nut body diameter, and a washer body at one end initially integral with the neck at other end thereof and having a counterbore opening at the washer body other end and communicating at its inner end with the neck threaded bore, the diameter of the counterbore at its inner end being but slightly less than the diameter of the neck adjacent the washer body, the end of the counterbore terminating in proximity to and but slightly spaced from the neck to define a readily rupturable neck-washer connection, the counterbore nesting the neck when axial pressure is applied to the nut and the washer said other end is work engaged, the said washer-neck connection being severable by relative axial movement between the washer and neck, the counterbore of said washer at the said other end having a chamfer forming a seat, the neck being of such length that, when counterbore nested, it has its ruptured end deformed outwardly and laterally by work engagement into seat association to clamp the washer body between that enlargement and the nut body when the two bodies are in intimate facial contact.

2. A structure as defined by claim 1 wherein the counterbore initially of tapered character.

3. A structure as defined by claim 1 wherein the neck exterior initially is of cylindrical character.

4. A structure as defined by claim 1 wherein the neck exterior initially is of frusto-conical character.

5. A structure as defined by claim 1 wherein the counterbore initially is of cylindrical character.

6. A structure as defined by claim 1 wherein the counterbore initially is of cylindrical character and the neck exterior initially is of frusto-conical character.

7. A structure as defined by claim 1 wherein the counterbore initially is of cylindrical character and the neck exterior initially is of cylindrical character.

8. A structure as defined by claim 1 wherein the counterbore initially is of tapered character and the neck exterior initially is of frusto-conical character.

9. A structure as defined by claim 1 wherein the counterbore initially is of tapered character and the neck exterior initially is of cylindrical character.

10. Structure as defined by claim 1 wherein parallel sections of the neck and washer transverse to the nut axis are defined by a neck exterior surface circle and a washer interior counterbore surface circle, certain of said circles having the same diameter.

11. Structure as defined by claim 1 wherein parallel sections of the neck and washer transverse to the nut axis are defined by a neck exterior surface circle and a washer interior counterbore surface circle, certain of the circles having different diameters.

12. Structure as defined by claim 1 wherein parallel sections of the neck and washer transverse to the nut axis are defined by a neck exterior surface circle and a washer interior counterbore surface circle, certain of the circles having different diameters, at least one of the washer section circles being of greater diameter than the diameter of the smallest neck section circle.

13. Structure as defined by claim 1 wherein parallel sections of the neck and washer transverse to the nut axis are defined by a neck exterior surface circle and a washer interior counterbore surface circle, certain of the circles having different diameters, at least one of the washer section circles being of lesser diameter than the diameter of the largest neck section circle.

14. Structure as defined by claim 1 wherein the neck adjacent the counterbore is provided with a counterbore of lesser diameter than the washer counterbore for stock reduction of the neck at the frangible connection between the neck and washer body.

EDWIN W. PUMMILL.

REFERENCES CITED

The following references are of record in the file of this patent:

UNITED STATES PATENTS

| Number | Name | Date |
| --- | --- | --- |
| 256,767 | Timby | Apr. 18, 1882 |
| 642,375 | Simpson | Jan. 30, 1900 |
| 1,875,930 | Martin | Sept. 6, 1932 |
| 1,928,769 | Teetor | Oct. 3, 1933 |
| 1,945,005 | Vacher | Jan. 30, 1934 |
| 2,285,080 | Berge | June 2, 1942 |
| 2,380,994 | Pummill | Aug. 7, 1945 |